(12) United States Patent
Hurst et al.

(10) Patent No.: US 10,169,727 B2
(45) Date of Patent: Jan. 1, 2019

(54) SYSTEMS AND METHODS FOR INITIATING A VIRTUAL MEETING AND TRANSMITTING ANCILLARY INFORMATION

(71) Applicant: AirWatch, LLC, Atlanta, GA (US)

(72) Inventors: Evan Hurst, Atlanta, GA (US); David Pierce Shaw, Buford, GA (US)

(73) Assignee: AirWatch, LLC, Atlanta, GA (US)

( * ) Notice: Subject to any disclaimer, the term of this patent is extended or adjusted under 35 U.S.C. 154(b) by 461 days.

(21) Appl. No.: 14/737,642

(22) Filed: Jun. 12, 2015

(65) Prior Publication Data

US 2016/0364665 A1    Dec. 15, 2016

(51) Int. Cl.
| | | |
|---|---|---|
| *G06Q 10/06* | (2012.01) | |
| *G06F 3/0484* | (2013.01) | |
| *G06F 3/0482* | (2013.01) | |
| *G06F 3/0346* | (2013.01) | |
| *H04L 12/18* | (2006.01) | |
| *H04M 1/725* | (2006.01) | |

(52) U.S. Cl.
CPC ..... *G06Q 10/06311* (2013.01); *G06F 3/0346* (2013.01); *G06F 3/0482* (2013.01); *G06F 3/04842* (2013.01); *H04L 12/1818* (2013.01); *H04M 1/72519* (2013.01); *H04M 1/72566* (2013.01); *H04M 1/72572* (2013.01); *H04M 2250/62* (2013.01)

(58) Field of Classification Search
USPC ......... 455/416, 411; 379/202.01; 701/1, 117, 701/2, 36, 425, 538; 715/702, 744, 745, 715/764
See application file for complete search history.

(56) References Cited

U.S. PATENT DOCUMENTS

| | | | | |
|---|---|---|---|---|
| 2005/0227680 A1* | 10/2005 | Snowden | ........ | H04M 1/274575 455/416 |
| 2007/0049261 A1* | 3/2007 | Joglekar | ........... | H04M 1/72566 455/416 |
| 2009/0264117 A1* | 10/2009 | Hsieh | .................... | H04M 1/576 455/418 |
| 2011/0076994 A1* | 3/2011 | Kim | ..................... | G06Q 10/109 455/414.2 |
| 2011/0150199 A1* | 6/2011 | Gisby | ................... | H04M 3/563 379/202.01 |

(Continued)

*Primary Examiner* — Doon Y Chow
*Assistant Examiner* — Wendy Nicholas
(74) *Attorney, Agent, or Firm* — Clayton, McKay & Bailey, PC

(57) ABSTRACT

Systems and methods for facilitating participation in a remote meeting or virtual conference are described. A client device can detect an upcoming calendar event and, based on a record associated with the calendar event, identify elements for participating in the event, as well as one or more access codes associated with the one or more participation elements. A notification can be displayed to a user, the notification including a prompt for selection by the user to automatically initiate participation in the event. After initiating the user's participation in the event, an interface can be displayed to the user including a link to the access code corresponding to the participation element(s) used to initiate participation in the event. Upon selection of the link, the access code can be automatically provided to the service hosting the event.

20 Claims, 8 Drawing Sheets

(56) References Cited

U.S. PATENT DOCUMENTS

| | | | | |
|---|---|---|---|---|
| 2012/0269333 A1* | 10/2012 | Goguen | ................ | H04M 3/565 |
| | | | | 379/202.01 |
| 2013/0145007 A1* | 6/2013 | Randazzo | ............. | H04W 48/04 |
| | | | | 709/223 |
| 2013/0303143 A1* | 11/2013 | Schrader | ............... | H04W 12/08 |
| | | | | 455/418 |
| 2014/0045465 A1* | 2/2014 | Colbert | ............... | H04L 12/1822 |
| | | | | 455/411 |
| 2014/0301247 A1* | 10/2014 | Yan | ........................ | H04M 3/38 |
| | | | | 370/259 |
| 2015/0004941 A1* | 1/2015 | Kim | ........................ | H04B 1/04 |
| | | | | 455/411 |
| 2015/0079943 A1* | 3/2015 | Williams | ............. | H04W 12/08 |
| | | | | 455/411 |
| 2016/0112572 A1* | 4/2016 | Ma | ....................... | H04M 3/563 |
| | | | | 379/202.01 |

* cited by examiner

400

Meeting Invitation

410 — Organizer: Scott Smith
420 — Invitees: John Wilson; Marc Bailey; Joe Cowell
430 — Subject: Weekly update
440 — Location: online conference
450 — Start time: 3/12/2015, 10:00 AM EST
460 — End time: 3/12/2015, 10:45 AM EST 470 — Please join my meeting from your computer, tablet, or smartphone:
https://joinmymeeting.com/ourbiz/138138

480 — You can also dial in using your phone.
United States: +1 (404) 411-0001
Toll free: +1 800-642-1380
UK: +44 208-237-0168

490 — Access code: 216-107-3030

Fig. 4

SYSTEMS AND METHODS FOR INITIATING A VIRTUAL MEETING AND TRANSMITTING ANCILLARY INFORMATION

BACKGROUND

Conference calls and virtual meetings among invitees located in geographically distinct locations are common occurrences in today's economy. This is particularly true for those who travel extensively as part of their job, have long commutes to work, are employed by a company with a number of geographically distinct offices, or frequently work from home. And with advancements in mobile technology, today's workforce is no longer tethered to a desk (or desktop computer). Thus, conference call or virtual meeting participants commonly join meetings using a mobile device, such as a smartphone.

Despite this growing need to cater to a mobile workforce, the process of scheduling a meeting, dialing-in or "attending" that meeting, and conveying ancillary information to other invitees of the meeting from a mobile device remain unduly cumbersome.

For example, a user of a mobile device typically will receive an alert from a calendar application of the mobile device, reminding the user of an upcoming meeting. Upon receiving the alert, or at a time coinciding with the start of the meeting, the user can navigate to the calendar application, select the appropriate day or time of the meeting, select the meeting that is about to begin, and then review the corresponding calendar event record to identify a phone number or hyperlink to join the meeting. The user's selection of the phone number or hyperlink, however, commonly launches another application, e.g., a phone application in the case where a phone number was selected by the user, or a web browser application in the case where a hyperlink was selected by the user. As a result, when a user is prompted to enter an access code for the meeting after this subsequent application launches, the user must navigate back to his or her calendar application, re-open the meeting invite, and then either memorize an access code within the event record or "select" and "copy" it from the text. Next, the user returns to the subsequent application for accessing the meeting (e.g., the phone application or web browser) and can manually enter the access code from personal memory or "paste" the code into an appropriate field. Only after the completion of all these steps can the user join the conference call or virtual meeting.

The burdensome nature of joining a virtual meeting or sharing information with other invitees using a mobile device is further exacerbated when a participant is driving. All of the aforementioned steps, including the manual input of call-in numbers and access codes, and the entering, exiting, and switching back and forth among applications, forces a user's attention away from the road and surroundings. Focusing on a mobile device rather than the act of driving not only puts the driver at risk, but also endangers other motorists.

Thus, a need exists for improved systems and techniques for initiating conference calls or virtual meetings, joining the meetings, and conveying ancillary information regarding a user to other meeting invitees. Moreover, improved systems and techniques are needed to ensure the safety of user's who participate in conference calls and virtual meetings while driving.

SUMMARY OF THE DISCLOSURE

In accordance with certain examples of the present disclosure, systems and methods for efficient participation in remote meetings or virtual conferences are disclosed. The methods can include detecting an upcoming calendar event and identifying, from data contained in a corresponding calendar event record, one or more participation elements for joining the event, e.g., identifying one or more phone numbers or web links (e.g., uniform resource locators). In further examples, one or more access codes associated with the one or more participation elements for joining the event can also be identified.

In another aspect, the methods can further include displaying a notification to a user, the notification including a prompt for receiving input from the user pertaining to his or her participation in the event. In one example, the prompt can be associated with a preferred or otherwise predetermined participation element for joining the event. Upon receiving input from the user indicative of the user's desire or willingness to join the event, the user can join the event automatically without manually dialing a phone number or access code identified within the calendar event record.

In a further aspect, a dialer interface can be displayed to the user after initiating the user's participation in the event. The dialer interface can include a link to an access code associated with the participation element(s) by which the user's participation was initiated. When prompted by a remote meeting or virtual conference service, the user can select the link to the access code, and the access code can be automatically dialed or otherwise transmitted to the remote meeting or virtual conference service.

In other examples, where more than one participation element for joining the event is included in the calendar event record, a most desirable participation element can be automatically determined based on contextual data. Examples of contextual data include a relative cost associated with joining the event using each of the participation elements, the user's geographic location, available communication channels, the respective signal strength or reliability of each available communication channel, and the permissions or access rights associated with the user.

In another example, a client device can detect an upcoming calendar event based on a record including a plurality of dial-in phone numbers (or other participation elements) for joining a meeting. The record can include one or more access codes associated with the dial-in numbers.

The client device can then display a notification pertaining to the event. The notification can include a prompt associated with the highest priority dial-in phone number for selection by the user.

The notification can also include additional prompts associated with, for example, declining participation in the event, delaying participation in the event, or joining the event using a lower priority participation element (e.g., a toll-based dial-in phone number or a high-bandwidth web service). The client device can also transmit information to other participants of the event based, at least in part, on whether the user is the organizer of the event. For example, where the client device or server can determine that the user is the organizer of the event, the user's decision to decline or delay participation in the event can trigger one or more messages to other participants indicating that the event is canceled or delayed, respectively. Alternatively, where the system determines that the user is not the organizer of the event, the user's decision to decline or delay participation in the event can trigger one or more messages to other participants indicating that the user will not be joining the event or will be joining late, respectively, without otherwise impacting the participation of the other participants.

A system including a remote management server, a communication network, and a mobile device is also described. The remote management server can make calls to an application management API or application-specific API of the mobile device to control, lock, or otherwise limit access to applications or functions of the mobile device. In one example, when the mobile device is moving, which can indicate a user is likely driving a vehicle, applications or functions of the mobile device can be locked to prevent the user from becoming distracted by the mobile device. The lock can prevent use of a calendar or phone application.

The mobile device can still detect an upcoming calendar event, identify a dial-in phone number (or other participation element) from an event record associated with the upcoming event, and display an actionable notification to the user for joining the event, even while the device remains in a locked state.

In one example, the notification can include an actionable prompt for joining the event, so that the mobile device can automatically dial the dial-in phone number based on the user selecting the prompt. The device can then display an interface to the user including a link to an access code associated with the dial-in phone number. When the user selects the link, the mobile device can automatically dial or otherwise transmit the access code to the event-hosting service. In this manner, joining a remote meeting or virtual conference from the mobile device while operating a vehicle requires little interaction between the user and the mobile device, and distractions are limited.

It is to be understood that both the foregoing general description and the following detailed description are illustrative and explanatory only and are not restrictive of the claims.

BRIEF DESCRIPTION OF THE DRAWINGS

FIG. 4 depicts an illustrative apparatus.

DESCRIPTION OF THE EXAMPLES

Techniques are described for joining a conference call or virtual meeting from a client device. In one aspect, upcoming calendar events can be detected and one or more participation elements for participating in the event, including dial-in phone numbers or web links, can be identified from within a record. A notification including an actionable prompt can then be displayed to a user. Selection of the prompt can automatically initiate the user's participation in the event.

Access code information associated with the participation element can also be identified from within the record. After initiating the user's participation in the event, an interface can be displayed to the user including a link associated with the access code. The user can then initiate automatic dialing or transmission of the access code by selection of the link.

Reference will now be made in detail to certain illustrative examples, examples of which are illustrated in the accompanying drawings. Wherever possible, the same reference numbers will be used throughout the drawings to refer to the same or like items.

Figure 1:
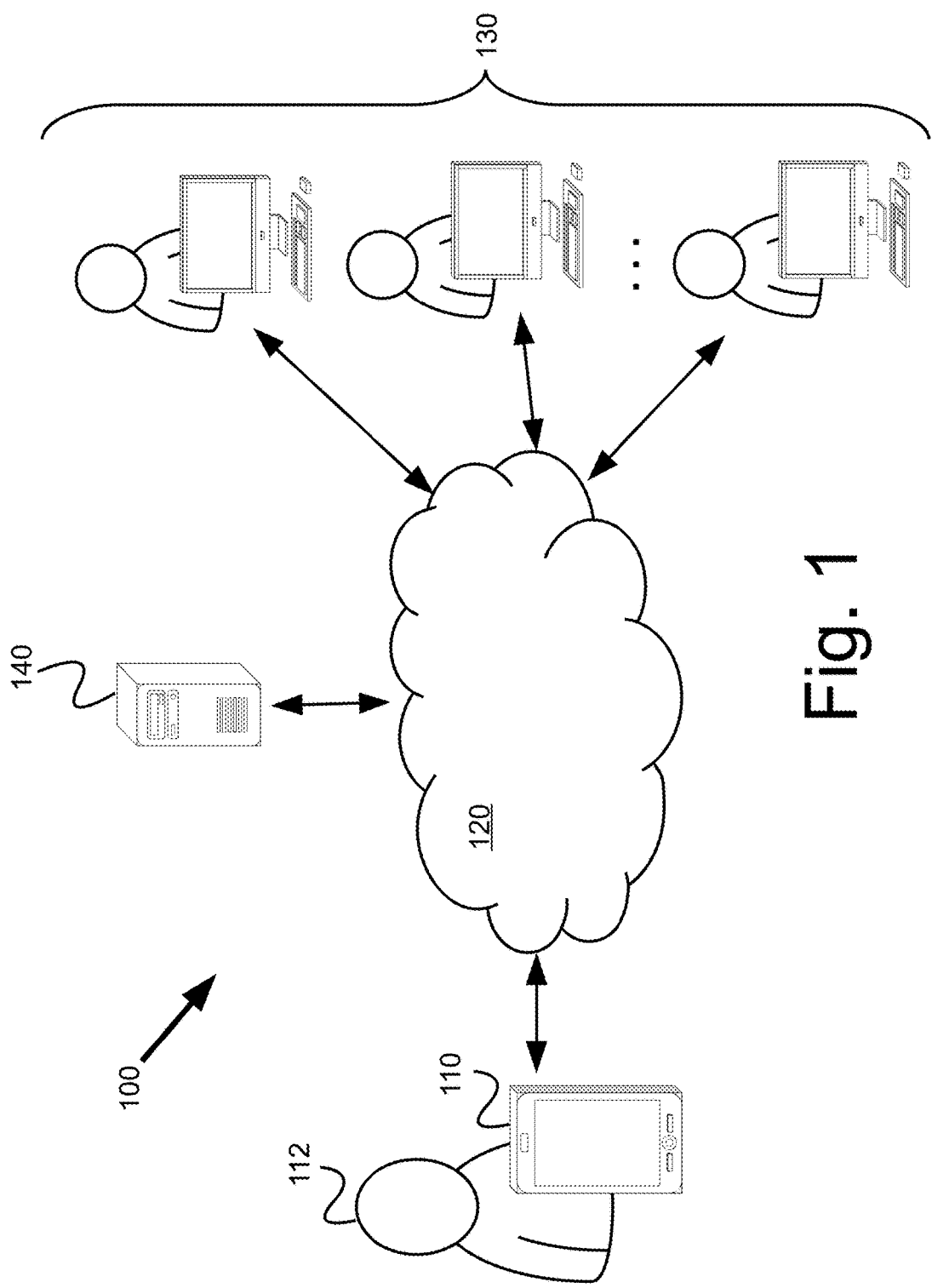
FIG. 1 depicts an illustrative system.

FIG. 1 depicts an illustrative example of a system 100. System 100 can include a mobile device 110, a communication network 120, one or more other client devices 130, and an enterprise mobility management ("EMM") server 140. In the depicted example, mobile device 100 includes a cellphone or smartphone operated by a user 112. In alternative examples, mobile device 100 can include a laptop, a tablet, a smartwatch, or any other controller- or processor-based mobile communication device.

Network 120 can include any one or more communication channels configured to facilitate a conference call or virtual meeting between user 112 and one or more other participants using any of client devices 130. Network 120 can include one or more wireless or wired communication channels, such as the Internet, a transceiver or cell network, a local area network, a workstation peer-to-peer network, a direct link network, or any other suitable communication channels.

Like mobile device 110, client devices 130 can be associated with one or more participants in a conference call or virtual meeting, and can include any suitable controller- or processor-based communication devices.

EMM server 140 can be in communication with mobile device 100 and one or more client devices 130 through network 120. In one example, EMM server 140 can manage accessibility and permissions associated with applications or functions of the client devices, including mobile device 110 and client devices 130, through APIs of those devices. Additionally, client devices having proper authority or access credentials can configure EMM server 140 and transmit information pertaining to application/function accessibility and permissions to be associated with other client devices.

Figure 2:
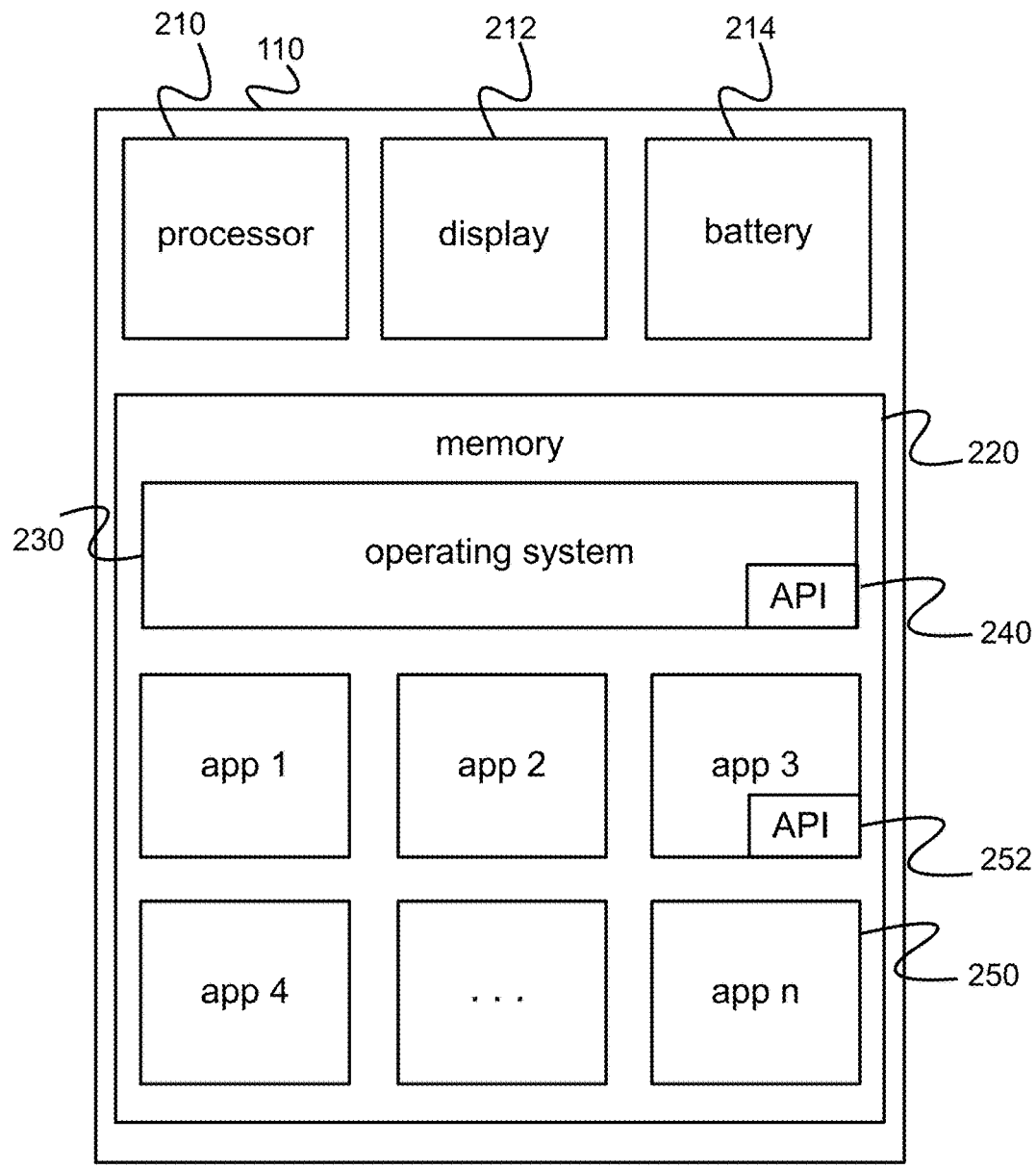
FIG. 2 depicts an illustrative apparatus.

FIG. 2 depicts an illustrative mobile device 110 or client device 130. Mobile device 110 can include a processor 210, a display 212, a battery 214, and a memory 220, along with additional elements not shown in FIG. 2. Some of those components are described in more detail with respect to FIG. 3.

Memory 220 can store an operating system 230. Operating system 230 can control mobile device 110's basic functions, schedule tasks, execute applications, and control or interface with peripheral devices.

Applications 250, executable by operating system 230, can also reside in memory 220. Examples of applications 250 can include an email application, a word processing application, a phone application, a calendar application, a texting application, an Internet browser application, and a contacts application.

An application management API 240 can also reside in operating system 230 or memory 220. A remote server (such as EMM server 140) can make calls to API 240 to control a user's access or permissions within applications 250. For example, API 240 can be used to block a user from accessing applications indefinitely or lock applications for a finite period of time. Alternatively, calls can be made to API 240 to block a user from accessing or using particular functionality within an application. Calls to API 240 can also initiate the transfer of information from one application to another or from device 110 to network 120. Any suitable constraints, permissions, or commands can be configured at EMM server 140 and transmitted to device 110 or can be configured at a remote device (e.g. one or more of client devices 130) and transmitted, through EMM server 140, to device 110. In another example, one or more of applications 250 can include a dedicated API for remote or local configuration of that application. Thus, device 110 can be locked into, or out of, using one or more applications based on calls to application-specific APIs.

One or more applications 250 can also include an application-specific API 252. Like application management API 240, a remote server (such as EMM server 140) can make calls to an application-specific API 252 to control a user's access or permissions within the corresponding application 250 or the functionality of the corresponding application 250. Throughout this description, it should be understood that calls to one or more APIs 252 can be used to achieve similar functionality as calls to an application management API 240, and embodiments can utilize either API 240, APIs 252, or some combination.

Figure 3:
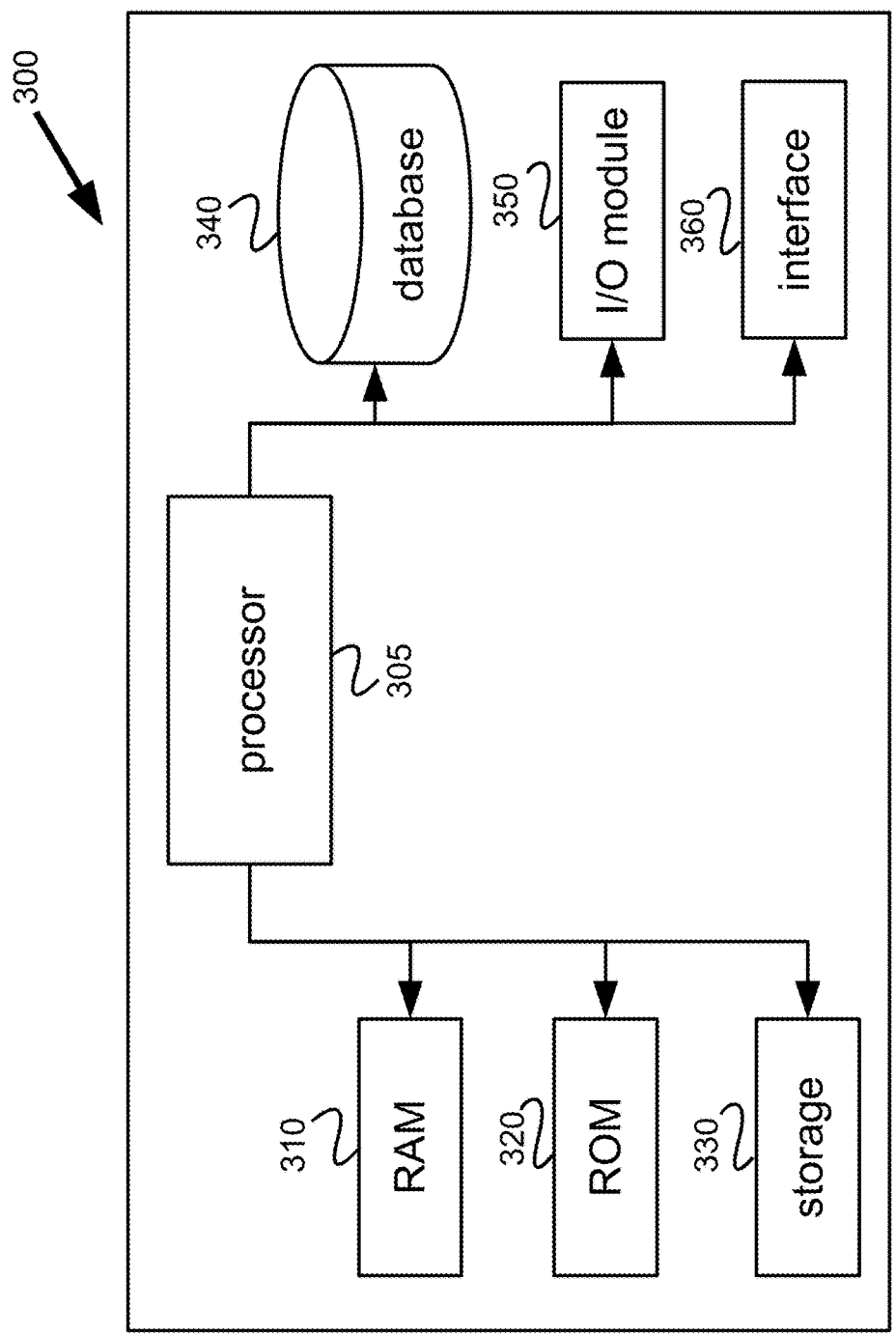
FIG. 3 depicts an illustrative computing system.

FIG. 3 depicts an illustrative processor-based computing system 300 representative of the type of computing system that can be present in mobile device 110, client devices 130, and EMM server 140.

System 300 can include one or more hardware and software components configured to execute software programs, such as software for storing, processing, and analyzing data. For example, system 300 can include one or more hardware components including a processor 305, a random access memory (RAM) module 310, a read-only memory (ROM) module 320, a storage system 330, a database 340, one or more input/output (I/O) modules 350, and an interface module 360. System 300 can also include one or more software components including, a computer-readable medium including computer-executable instructions for performing the disclosed methods.

Processor 305 can include one or more processors, each configured to execute instructions and process data to perform functions associated with system 300. The term "processor," as generally used in this description, refers to any logic processing unit, including central processing units (CPUs), digital signal processors (DSPs), application specific integrated circuits (ASICs), field programmable gate arrays (FPGAs), and similar devices. Processor 305 can communicate with RAM 310, ROM 320, storage 330, database 340, I/O module 350, and interface module 360. Processor 305 can execute sequences of computer program instructions to perform various processes, which will be described in detail below. The computer program instructions can be loaded into RAM for execution by processor 305.

RAM 310 and ROM 320 can store information associated with an operation of system 300 and processor 305. For example, ROM 320 can include a memory device configured to access and store information associated with system 300, including information for identifying, initializing, and monitoring the operation of one or more components and subsystems of system 300. RAM 310 can include a memory device for storing data associated with one or more operations of processor 305. For example, ROM 320 can load instructions into RAM 310 for execution by processor 305.

Storage 330 can include any type of storage device configured to store information that processor 305 needs to perform processes consistent with the disclosed examples.

Database 340 can include one or more software and hardware components that cooperate to store, organize, sort, filter, and arrange data used by system 300 and processor 305.

I/O module 350 can include one or more components configured to communicate information with a user associated with system 300. For example, I/O module 350 can include one or more buttons, switches, touchscreens, or microphones to allow a user to input parameters associated with system 300. I/O module 350 can also include a display including a graphical user interface (GUI) and one or more light sources for outputting information to the user. I/O module 350 can also include one or more communication channels for connecting system 300 to one or more peripheral devices, such as a printer, a user-accessible disk drive (e.g., a USB port, a floppy, CD-ROM, or DVD-ROM drive), a microphone, a speaker system, or any other suitable type of interface device.

Interface 360 can include one or more components configured to transmit and receive data through a communication network, such as the Internet, a local area network, a workstation peer-to-peer network, a direct link network, a wireless network, or any other suitable communication channel. For example, interface 360 can include one or more modulators, demodulators, multiplexers, demultiplexers, network communication devices, wireless devices, antennas, modems, and any other type of device configured to enable data communication through a communication network.

FIG. 4 depicts an example of a calendar event record 400. Record 400 can be associated with a calendar application of device 110 (and client devices 130). In one example, record 400 includes information necessary for user 112 to join or participate in an event, such as a conference call or virtual meeting, with one or more other remote participants. In this example, record 400 can include organizer information 410, invitee information 420, subject information 430, location information 440, start time information 450, end time information 460, hyperlink information 470 for attending the call or meeting through the Internet, a web browser, or other web portal, dial-in information 480 including phone numbers for attending the call or meeting, and access code information 490 for authenticating call or meeting participants. In this example, the hyperlink information 470, dial-in information 480, and access code information 490 can include elements for joining the event. Of course, calendar event record 400 depicted in FIG. 4 is only illustrative. Record 400 can include additional, less, or alternative information from that depicted in FIG. 4.

In one example, organizer information 410 and invitee information 420 can include identify the organizer and other invited participants of the event. The identification information can include participant names, as well as contact information (e.g., email addresses and phone numbers). Alternatively, device 110 can cross-reference a contact book application storing contact information and, based on participant names, identify contact information for each participant.

When start time information 450 of record 400 indicates that a conference call or virtual meeting will be commencing (e.g., a call or meeting is commencing in an hour, 15 minutes, or some other predetermined period of time), record 400 can be text searched for participation elements for joining the event, such as dial-in information 480. The search can use any suitable character recognition routine and can isolate numerical character strings of a length indicative of a phone number and alphanumeric patterns indicative of a uniform resource location or Internet address. In alternative examples, device 110 can store information indicating where phone number information (or another participation element) is stored in a calendar event record created by a particular application or meeting hosting service. Device 110 can isolate and relevant portions of record 400 in which dial-in information 480 is typically stored.

Device 110 can also cross-reference state information, including geographic location, available communication channels (e.g., cell network, Wi-Fi connectivity, or Internet availability), signal strength corresponding to the available communication channels, and device service plans (e.g., in the case of a cell phone, whether roaming charges apply, or in the case of an Internet communication channel, whether data limits apply). Based on the state information, device 110 can select the most desirable phone number. In further examples, device 110 can cross-reference any additional or alternative state information that may be beneficial in selecting a most desirable phone number among dial-in information 480.

Application management API 240 can provide information associated with the user of device 110, his or her permissions, and dial-in options. For example, the user may not have permission to initiate roaming phone calls over a cell network from device 110. Device 110 can, therefore, select the most desirable phone number or communication channel for the call or meeting by avoiding a call while roaming. The user's participation in the call or meeting using device 110 can even be blocked by if the user lacks sufficient permissions/access to initiate participation in light of available communication options.

In a further aspect, device 110 can provide a prompt for initiating the conference call or virtual meeting using the most desirable phone number or communication channel when notifying the user of the upcoming call or meeting. Further details regarding a notification and prompting the user are described below.

Figure 5:
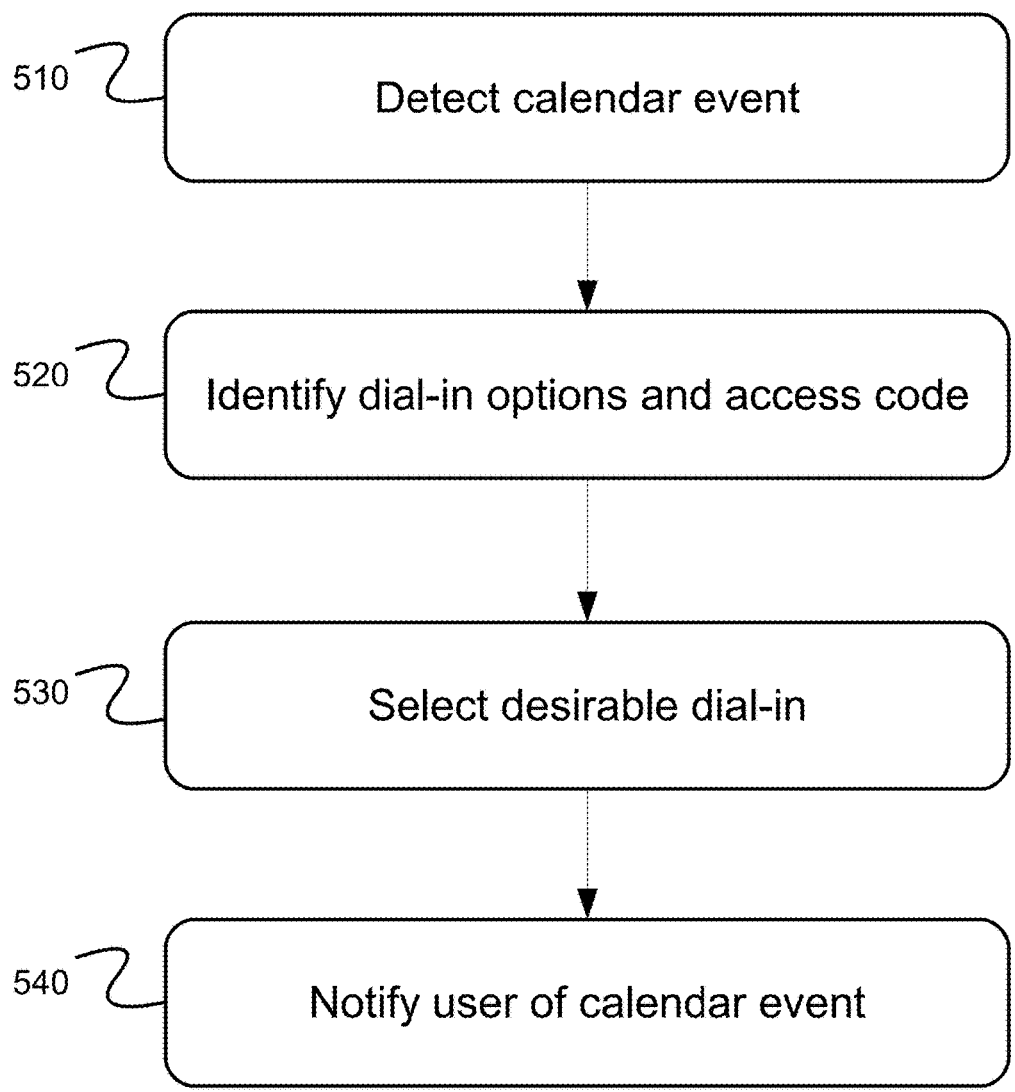
FIG. 5 depicts an illustrative method.

FIG. 5 depicts an illustrative method for notifying a user of an upcoming conference call or virtual meeting. Device 110 can detect an upcoming calendar event at step 510 and schedule a user notification. An upcoming event can be detected and a notification can be scheduled at any suitable time period prior to the event, e.g., one day, one hour, or one minute.

At step 520, device 110 can identify one or more call-in options, phone numbers, hyperlinks, or another participation element for initiating participation in the call or meeting using, for example, character or pattern recognition algorithms. Alternatively, where the format of the calendar event record is known, one or more call-in options, phone numbers, or hyperlinks can be identified within the relevant data fields of the record.

Once available dial-in options are identified, device 110 can prioritize the options or otherwise determine a most desirable option at step 530. Priority or desirability of the options can be based on a number of factors, including the geographic location of device 110, presently available communication channels (e.g., cell network, Wi-Fi connectivity, or Internet availability), signal strength corresponding to each presently available communication channel, device service plans, and device-specific permissions/access that can be configured remotely and transmitted to device 110 through application management API 240 or application-specific API 252. The device 110 can be configured by the user regarding how much priority or weight to give particular options.

For example, device 110 can identify three call-in options from a calendar event record: a local phone number; a toll-free phone number (e.g., an "800" number); and an international number (e.g., a phone number including a non-U.S. country code). In this example, device 110 can then determine the most desirable call-in option based on the geographic location of device 110, which can be determined based on GPS information of the device, the location of a network with which device 110 can be in communication, and other suitable, available geographic-identifying information. Based on the geographic location of device 110, the toll-free phone number can be prioritized higher (or determined to be more desirable) than the local phone number of the international number to avoid long-distance phone charges. Alternatively, an Internet- or browser-based call-in option can be prioritized above phone numbers where no phone call can be made without incurring charges, device 110 has a satisfactory web connection, and no or fewer charges will be incurred by joining the call or meeting through the Internet. Of course, these are only examples of how one or more call-in options can be prioritized with respect to one another, and one of skill in the art will appreciate than any suitable criteria and available data can be used to prioritize one or more call-in options. When the calendar invite provides a single dial-in option, that option can be used assuming the user has sufficient access rights.

At step 540, the user can be notified of the upcoming call or meeting. The notification can include initiation information including the most desirable call-in option. Alternatively, where the system determines that the user lacks sufficient permissions/access to initiate participation in the call or meeting in light of the available communication channels and other restrictions, the user can be notified that his or her participation in the call or meeting is blocked. In still other examples, the user may not receive a notification regarding the upcoming call or meeting where that user lacks sufficient permissions/access to join.

For example, a first user having a first set of permissions/access associated with his or device 110 can be permitted to incur long-distance or roaming charges associated with calls. Thus, even if the most desirable dial-in option would require incurring the charges, the first user can be notified of the call or meeting, and presented with the most desirable dial-in option. A second user having a second set of permissions/access, on the other hand, may not be permitted to incur long-distance or roaming charges. As a result, the second user may be: presented with another available dial-in option; notified that he or she is not permitted to join the call or meeting; and not notified regarding the commencement of the call or meeting.

In a further example, where a user does not have adequate permissions/access to join the call or meeting using one of the provided communication channels, one or more messages can be transmitted to other participants of the event, such as the meeting organizer, notifying participants that the user is unable or lacks permissions to join.

Figure 6:
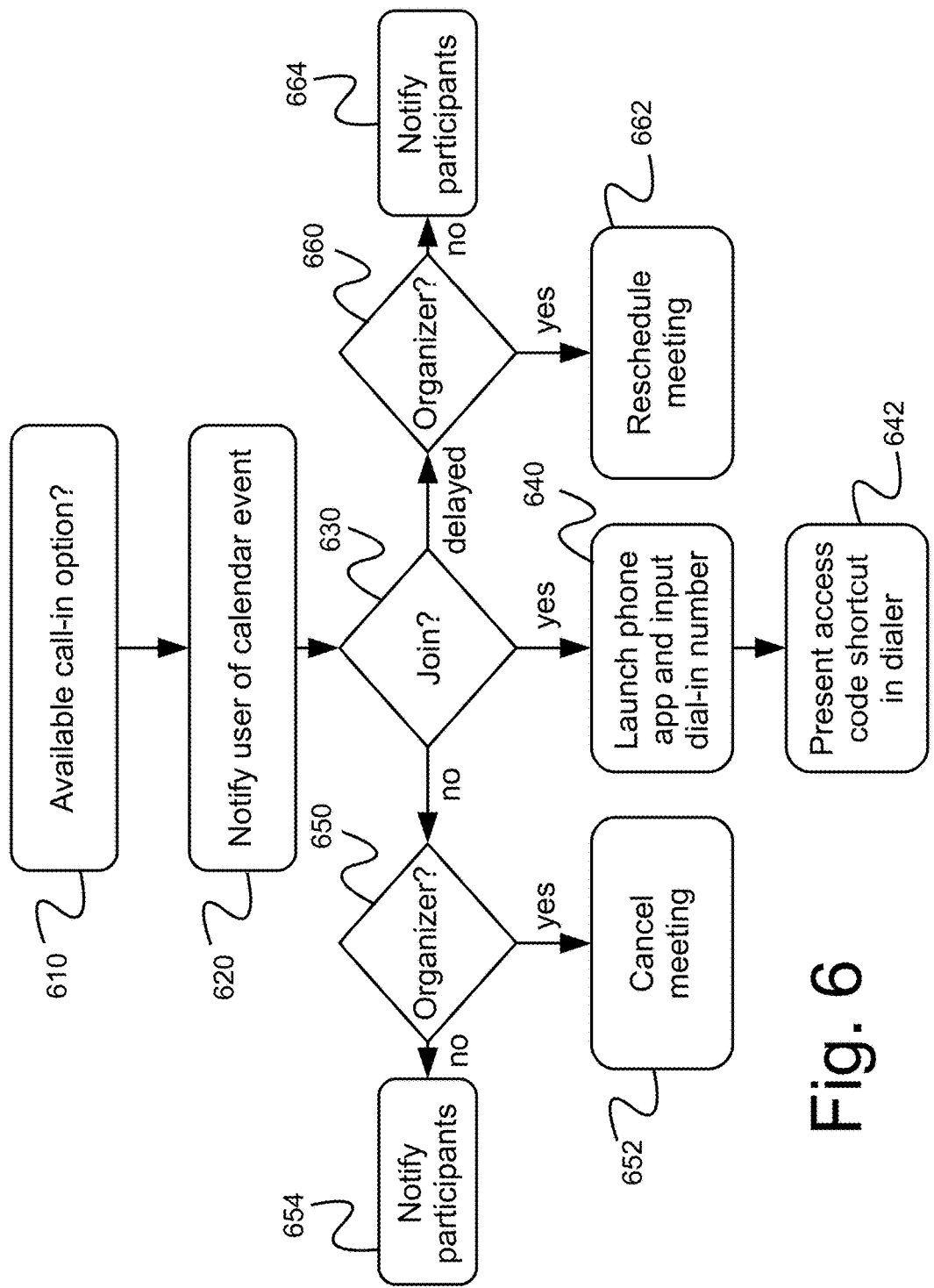
FIG. 6 depicts an illustrative method.
Figure 7:
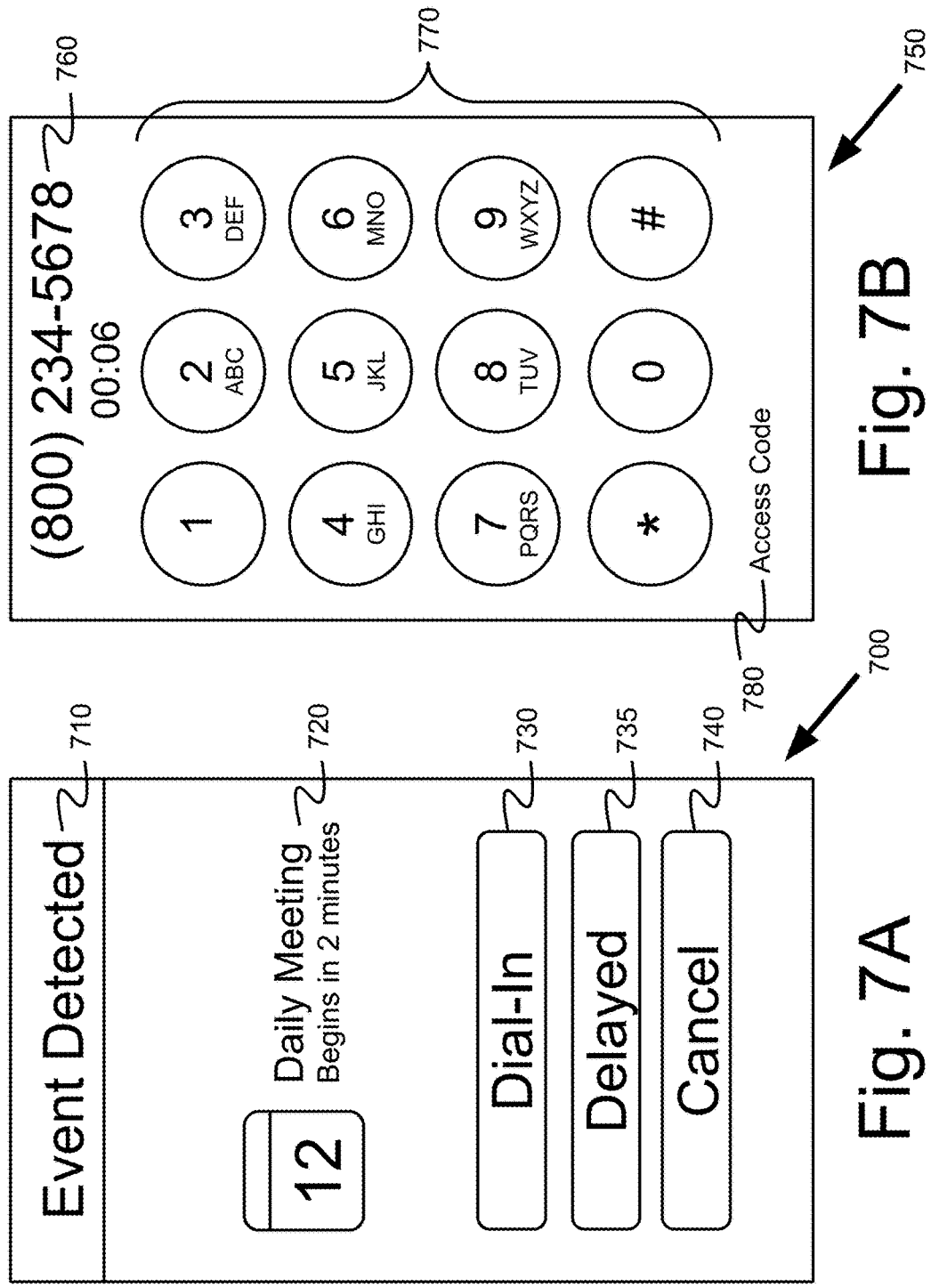
FIG. 7A depicts an illustrative apparatus.
FIG. 7B depicts an illustrative apparatus.

FIG. 6 depicts one example of a method for notifying a user of an upcoming conference call or virtual meeting and receiving the user's feedback. At step 610, device 110 can identify a most desirable call-in option and confirm that the user is associated with adequate permissions/access to utilize one of the available call-in options.

Where at least one call-in option is available, at step 620, device 110 can present the user with a notification associated with a conference call or virtual meeting. The notification can be displayed, and can be accompanied by an audible sound or haptic feedback. An illustrative example of the user interface associated with the notification is depicted in FIG. 7A and described in more detail below. In another aspect, the notification can be transmitted and displayed to a user at a predetermined time prior to the scheduled commencement of the event. For example, the notification can be transmitted or displayed 1 minute, 2 minutes, 5 minutes, or some other period of time prior to event commencement. Alternatively, the notification can be transmitted at, or shortly after, the scheduled commencement time of the event.

The notification can request input from the user to join the event, at step 620. In one example, the prompt can include a plurality of options from which the user can choose. For example, the prompt can include a "yes," "join," or "dial-in" option, a "no" or "not joining" option, and a "delayed," "not now," or "snooze" option. Alternatively or additionally, the user can be presented with a plurality of dial-in options from which to choose and the notification can include graphical elements indicative of each options desirability or priority.

Device 110 can also detect if it is connected to another device through Bluetooth or another peer-to-peer protocol. If so, device 110 can supply a voice prompt. This can result, for example, in the device 110 alerting and prompting the user through a sound system in the user's vehicle, allowing the user to connect to a meeting without looking at the device 110.

The prompts can be conveyed as "soft buttons" on a display of device 110, so that a user can touch (using a touchscreen) a button corresponding to the option indicative of the user's intent. In other examples, the user can select an available option using alternative input devices, such as a keypad, a switch, a scroll wheel, or a hard button.

At step 640, after receiving input from the user indicating a desire or willingness to join the event, device 110 can launch a phone application and automatically dial the preferred dial-in number identified from calendar event record 400 and selected by the user from within the notification.

Within the phone application, device 110 can display a dialer interface in an example (an example of which is depicted in FIG. 7B). The user can use the dialer interface to navigate menus of, or otherwise enter input to, the call or meeting service. For example, the user may be prompted to dial "1" for an English menu.

At step 642, a link or shortcut to the previously-identified access code can be embedded within the dialer interface in an example. In this manner, when prompted by the call or meeting service, the user can select the link or shortcut to automatically dial the digits of the access code. Thus, the user may not be required to navigate directly to the calendar application or the calendar event record to retrieve the access code. In alternative examples, device 110 can access a database, memory, or record containing an association between the call or meeting service in use and a period of time between completion of the dial-in and the prompt for the access code. For example, a record can indicate that for a specific meeting service, X number of seconds typically elapses between the time a call to the meeting service is connected and the time at which the user is prompted to enter the access code for entering a meeting. When such information is known, rather than providing a link or shortcut for the access code to the user within the dialer interface, device 110 can automatically input access code information from the device's phone application or dialer interface at the predetermined or appropriate time. As a result, the user can join a meeting simply by selecting "dial in," for example, with the process of selecting a phone number and entering an access code being handled without additional user input. In one example, the notification can be provided even when a device is locked. This avoids a user having to enter a device password to initiate a call and join a meeting.

In another aspect, rather than electing to join or participate in the event, the user can decline to enter the call or meeting. Upon receiving input from the user indicating the user's refusal to join the event, device 110 can determine whether the user is the organizer of the calendar event at step 650. For example, device 110 can compare the user's identity to organizer information 410 within event record 400 or any other information indicative of the event's organizer.

Where the system determines that the user is the organizer, device 110 can transmit one or more messages to the other invitees at step 652, notifying the invitees that the organizer will not be attending and is canceling the event. As described above, contact information for each invitee of the event can be determined based, at least in part, on invitee information 420 of record 400 and information stored in conjunction with an address book or contact book of device 110.

Where the system determines that the user is not the organizer, at step 654, device 110 can transmit one or more messages to the other participants, notifying them that the user is unable or unwilling to attend the meeting but otherwise not impacting commencement of the event.

Returning to step 630, the user can also elect to delay participation or entrance into the call or meeting. Similar to step 650, upon receiving input from the user indicating the user's desire to delay participation in the event device 110 can determine whether the user is the organizer of the calendar event at step 660. Where the system determines that the user is the organizer, device 110 can transmit messages to the other invitees, rescheduling or otherwise delaying the event. The event can be delayed a predetermined period of time and an amount of time selected by the user. For example, the event can be delayed 15 minutes, 1 hour, 1 day, or some other period of time.

Where the system determines that the user is not the organizer, device 110 can transmit one or more messages to the other participants, notifying them that the user is delayed but otherwise not impacting commencement of the event. The participants can be notified that the user intends to join the event in a predetermined period of time and an amount of time selected by the user.

FIG. 7A depicts one example of a notification interface 700 for an upcoming or ongoing event that can be displayed to the user at device 110 or on a remote display. In one aspect, the notification interface can include an alert heading 710, an event title and description 720, and user options 730, 735, and 740.

In another aspect, heading 710 can alert the user to a type of notification, e.g. "Event Detected" or "Calendar Event." Event title and description information 720 can provide additional details regarding the event. For example, information 720 can include the current date or time, subject information 430 or location information 440 from an event record 400, other information of event record 400, and an amount of time prior to commencement of the event.

Interface 700 can further include one or more options for receiving feedback or input from the user regarding the user's willingness to join the event. Interface 700 can communicate a first option 730 for indicating the user's willingness to join the event (e.g., a "yes," "join" or "dial-in" option), a second option 735 for indicating the user's desire to delay the event or delay joining the event (e.g., a "delayed," "not now," or "snooze" option), and a third option 740 for indicating the user's refusal to join the event or desire to cancel the event (e.g., a "no," "not joining," or "cancel" option).

FIG. 7B depicts an illustrative example of a dialer interface 750 that can be displayed to the user when joining or commencing an event, in accordance with an example. In one aspect, dialer interface 750 can include ancillary meeting information 760, a keypad 770, and an access code shortcut 780.

In one example, ancillary meeting information 760 can include information regarding the call or meeting service (e.g., the call-in number, the name of a web service, or a URL). Ancillary meeting information 760 can also indicate how long the event has been ongoing.

In another aspect, dialer interface 750 can include a keypad or some other option for receiving inputs from the user to facilitate navigation of any menus presented to the user by the conference or meeting service. Again, these examples of ancillary meeting information 760 and keypad 770 are only illustrative of the possibilities and any suitable information can be displayed in conjunction with dialer interface 750.

In a further aspect, dialer interface 750 can include a shortcut or link 780 associated with access code information 490 of calendar event record 400. In this manner, and at the appropriate time, the user can select access code link 780 at interface 750 and access code information 490 can be automatically dialed or otherwise transmitted to the conference or meeting service. In the example of FIG. 7B, access code link 780 is depicted as a soft button at the lower left-hand side of interface 750. In other examples, link 780 can be selected using any suitable input mechanism and link 780 can be located elsewhere within interface 750. In other examples, the access code can be provided automatically upon joining a call, without requiring selection of item 780.

A description of operation for when the user is driving or in other instances in which the user should not focus a significant amount of attention on a display of device 110 or on entering inputs at device 110 will now be provided. Device 110 can detect that the user is likely driving a vehicle using GPS information. Alternatively, where device 110 includes an application management API (such as that depicted in FIG. 2), a remote administrative system (e.g., EMM server 140 or an associated administrative client device) can determine that the user is likely driving a vehicle through a call to, and data retrieved from, the API.

Figure 8:
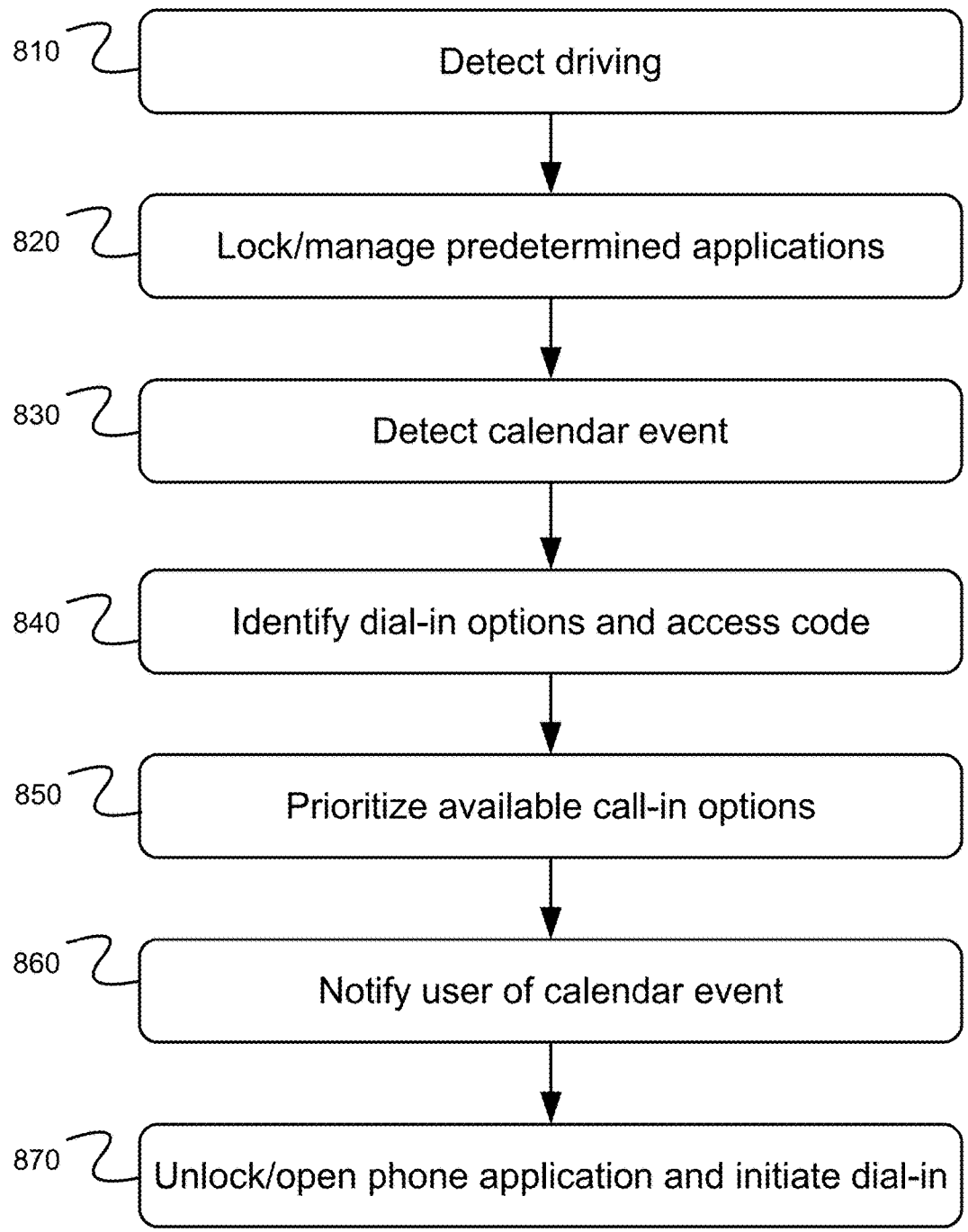
FIG. 8 depicts an illustrative method.

FIG. 8 depicts an illustrative method for detecting when a user is likely driving a vehicle. At step 810, device 110 or a remote administrative system can determine that the user is likely driving a vehicle. The determination can be made based on GPS data retrieved from device 110 indicating that the device is traveling above a predetermined speed threshold. For example, a determination that the user is likely driving a vehicle can be made where GPS data indicates that the device is traveling at a speed in excess of 5 miles per hour or some other suitable speed threshold. In examples in which a remote administrative system can detect driving conditions, speed and GPS data can be collected from device 110 through one or more available APIs (e.g., application management API 240 or application-specific API(s) 252) configured to facilitate the transfer of information between device 110 and remote server 140. A determination that the driver is likely driving can also be made or inferred based on any other suitable data, such as cell tower triangulation data, direct user inputs, or detection of a close proximity communication channel with a vehicle (e.g., a Bluetooth connection with a known vehicle).

Upon determining that the user is likely driving, device 110, a remote administrative system, based on a call to application management API 240 or application-specific API 252, can apply locks to one or more applications or functions of device 110 at step 820. For example, upon a determination that the user is likely driving a vehicle, locks can be applied to device 110 to prevent the user from accessing a texting or email application. In other examples, locks can be applied to device 110 to prevent the user from accessing any features or functions of device 110 other than those that may be needed in an emergency (e.g., calling 911 or dialing a phone number from a stored white list of phone numbers). In this manner, the user can be prevented from engaging in any activity on device 110 that may distract the user from driving the vehicle.

Prior to, concurrently, or after application of one or more locks, device 110 can: detect an upcoming calendar event at step 830 and schedule a notification to the user; identify participation elements, such as call-in options, phone numbers, hyperlinks, and access codes from a calendar event record at step 840; prioritize the identified call-in options or otherwise determine a most desirable option at step 850; and notify the user of the upcoming call or meeting (e.g., display the notification depicted in FIG. 7A) or determine that the user lacks sufficient permissions/access to join the event using an available communication channel. Upon receiving a notification associated with a calendar event, a user can indicate a desire to join, not join, cancel, or delay participation in the event in a manner substantially similar to that described with respect to FIG. 6.

At step 870, where the user has expressed a desire to join or call-in to the conference or meeting, device 110 can remove one or more locks associated with a phone application and automatically dial a call-in phone number. In a further example, device 110 can display a dialer interface such as that depicted in FIG. 7B. Thus, when prompted by the conference or meeting service, the user can select link 780 and the associated access code 490 can be automatically dialed or otherwise transmitted to the service.

In this manner, a user operating a vehicle can be alerted to an upcoming conference or meeting, and join that conference or meeting with limited interactions with device 110 and not diverting attention away from the road or any surrounding vehicles. For example, the user may only have to make two taps on device 110's display (a first to join the meeting, and a second to enter the access code) in order to join and participate in the conference or meeting. Where device 110 can associate a conference or meeting service with a predetermined delay between connection of a phone call and a prompt for the access code, the user can join a remote meeting with a single tap or input (the access code being entered or transmitted automatically by device 110 after the predetermined delay has elapsed). Even when a user's device is locked from a password protected screen, a notification allowing dial-in can be provided without a user having to enter their device password to unlock the device. This option of allowing a dial-in even from a locked device can be used when the device is in motion to minimize distractions.

At the end of scheduled calendar event or upon detection that the user has terminated connection to the call or meeting, device 110, remote administrative system, application management API 240, or application-specific API 252 can reinitiate any application locks removed for the purposes of facilitating the user's participation in the event (e.g., reinstate any locks to the phone application or web browser application).

While a number of examples have been illustrated and described, it will be appreciated that various changes can be made without departing from the spirit and scope of the disclosure. For example, though some methods presented here may be described as a series of steps, it will be appreciated that one or more steps can occur simultaneously, in an overlapping fashion, and in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example.

Additional features can also be incorporated into the described systems and methods to improve their functionality. For example, the systems and methods described here can be incorporated into a vehicle control system so that the aforementioned processes can be initiated upon connection of a mobile device to the vehicle through, for example, a Bluetooth or RF signal connection. Furthermore, the devices and methods described here can incorporate user override features. For example, a user or administrator can customize rules for prioritizing event participation channels (e.g., establish a preference for phone numbers over web links, or set a predetermined limit regarding charges to be incurred during participation in an event).

What is claimed is:

1. A method for managing participation in a virtual meeting using a mobile device, comprising:
   detecting an upcoming event associated with a calendar event record;
   identifying a plurality of participation elements within the calendar event record;
   identifying a set of permissions associated with a user of the mobile device, wherein the set of permissions differs from a second set of permissions associated with a second user of a second mobile device;
   selecting, without input from the user, a participation element from the plurality of participation elements, wherein the selection is based on the set of permissions associated with the user, and wherein the selection differs from a selection based on the second set of permissions;
   displaying a notification of the event to the user, the notification prompting the user for input associated with joining the event and being displayed while the mobile device is in a locked state;
   in response to displaying the notification prompting the user for input receiving an input from the user associated with delaying participation in the event;
   determining whether the user is an organizer of the event;
   based on determining that the user is the organizer of the event, transmitting one or more messages to other event participants rescheduling or otherwise delaying the event; and
   based on determining that the user is not the organizer of the event, transmitting one or more messages to other event participants notifying them that the user is delayed.

2. The method of claim 1, further comprising reinitiating the locked state of the mobile device upon detection of at least one of the end of the calendar event and the user leaving, cancelling, or postponing the event.

3. The method of claim 2, further comprising:
   detecting that the mobile device is in motion; and
   displaying the notification in the locked state when the device is in motion.

4. The method of claim 1, wherein a remote management server determines that the user of the mobile device is likely driving based, at least in part, on an alert transmitted to the remote management server by the mobile device upon detection by the mobile device of one or more conditions.

5. The method of claim 4, wherein the conditions include:
   a detection that the mobile device is traveling at a speed above a predetermined threshold;
   the mobile device being in communication with a vehicle communication system; and
   reception of input by the user indicating that the user is driving a vehicle.

6. The method of claim 1, wherein selecting the participation element comprises identifying a plurality of participation elements within the calendar event record and determining a most desirable participation element from the plurality of participation elements.

7. The method of claim 6, wherein determining the most desirable participation element from the plurality of participation elements is based, at least in part, on determining a relative cost associated with joining the event via each of the plurality of participation elements.

8. A non-transitory, computer-readable medium containing instructions that, when executed by a processor, cause the processor to perform stages comprising:
   detecting an upcoming event associated with a calendar event record;
   identifying a plurality of participation elements within the calendar event record;
   identifying a set of permissions associated with a user of the mobile device, wherein the set of permissions differs from a second set of permissions associated with a second user of a second mobile device;
   selecting, without input from the user, a participation element from the plurality of participation elements, wherein the selection is based on the set of permissions associated with the user, and wherein the selection differs from a selection based on the second set of permissions;
   displaying a notification of the event to the user, the notification prompting the user for input associated with joining the event and being displayed while the mobile device is in a locked state;
   in response to displaying the notification prompting the user for input, receiving an input from the user associated with postponing the event;
   determining whether the user is an organizer of the event;
   based on determining that the user is the organizer of the event, transmitting one or more messages to other event participants rescheduling or otherwise delaying the event; and
   based on determining that the user is not the organizer of the event, transmitting one or more messages to other event participants notifying them that the user is delayed.

9. The non-transitory, computer-readable medium of claim 8, the stages further comprising reinitiating the locked state of the mobile device upon detection of at least one of the end of the calendar event and the user leaving, cancelling, or postponing the event.

10. The non-transitory, computer-readable medium of claim 9, the stages further comprising:
    detecting that the mobile device is in motion; and
    displaying the notification in the locked state when the device is in motion.

11. The non-transitory, computer-readable medium of claim 8, wherein a remote management server determines that the user of the mobile device is likely driving based, at least in part, on an alert transmitted to the remote management server by the mobile device upon detection by the mobile device of one or more conditions.

12. The non-transitory, computer-readable medium of claim 11, wherein the conditions include:
    a detection that the mobile device is traveling at a speed above a predetermined threshold;

the mobile device being in communication with a vehicle communication system; and reception of input by the user indicating that the user is driving a vehicle.

13. The non-transitory, computer-readable medium of claim 8, wherein selecting the participation element comprises identifying a plurality of participation elements within the calendar event record and determining a most desirable participation element from the plurality of participation elements.

14. The non-transitory, computer-readable medium of claim 13, wherein determining the most desirable participation element from the plurality of participation elements is based, at least in part, on determining a relative cost associated with joining the event via each of the plurality of participation elements.

15. A system for managing participation in a virtual meeting using a mobile device, comprising:

a processor; and a memory storing instructions that, when executed by the processor, cause the processor to perform stages comprising:

detecting an upcoming event associated with a calendar event record;

identifying a plurality of participation elements within the calendar event record;

identifying a set of permissions associated with a user of the mobile device, wherein the set of permissions differs from a second set of permissions associated with a second user of a second mobile device;

selecting, without input from the user, a participation element from the plurality of participation elements, wherein the selection is based on the set of permissions associated with the user, and wherein the selection differs from a selection based on the second set of permissions;

displaying a notification of the event to the user, the notification prompting the user for input associated with joining the event and being displayed while the mobile device is in a locked state;

in response to displaying the notification prompting the user for input, receiving an input from the user associated with postponing the event;

determining whether the user is an organizer of the event;

based on determining that the user is the organizer of the event, transmitting one or more messages to other event participants rescheduling or otherwise delaying the event; and based on determining that the user is not the organizer of the event, transmitting one or more messages to other event participants notifying them that the user is delayed.

16. The system of claim 15, the stages further comprising reinitiating the locked state of the mobile device upon detection of at least one of the end of the calendar event and the user leaving, cancelling, or postponing the event.

17. The system of claim 16, the stages further comprising:
detecting that the mobile device is in motion; and
displaying the notification in the locked state when the device is in motion.

18. The system of claim 15, wherein a remote management server determines that the user of the mobile device is likely driving based, at least in part, on an alert transmitted to the remote management server by the mobile device upon detection by the mobile device of one or more conditions.

19. The system of claim 18, wherein the conditions include:

a detection that the mobile device is traveling at a speed above a predetermined threshold;

the mobile device being in communication with a vehicle communication system; and reception of input by the user indicating that the user is driving a vehicle.

20. The system of claim 15, wherein selecting the participation element comprises identifying a plurality of participation elements within the calendar event record and determining a most desirable participation element from the plurality of participation elements.

* * * * *